United States Patent
Laurila et al.

(10) Patent No.: US 6,829,312 B1
(45) Date of Patent: Dec. 7, 2004

(54) ITERATIVE PROJECTION WITH INITIALIZATION USING A NETWORK USER IDENTIFIER

(75) Inventors: Juha Laurila, Vienna (AT); Ernst Bonek, Vienna (AT)

(73) Assignee: Nokia Oyj, Espoo (FI)

( * ) Notice: Subject to any disclaimer, the term of this patent is extended or adjusted under 35 U.S.C. 154(b) by 0 days.

(21) Appl. No.: 09/719,244

(22) PCT Filed: Jun. 8, 1999

(86) PCT No.: PCT/FI99/00493

§ 371 (c)(1),
(2), (4) Date: May 7, 2001

(87) PCT Pub. No.: WO99/65161

PCT Pub. Date: Dec. 16, 1999

(30) Foreign Application Priority Data

Jun. 9, 1998 (AT) .............................................. 993/98

(51) Int. Cl.[7] .............................. H04L 27/06; H04B 7/10
(52) U.S. Cl. ....................................... 375/340; 375/347
(58) Field of Search ................................. 375/340, 362, 375/347

(56) References Cited

U.S. PATENT DOCUMENTS

| | | | |
|---|---|---|---|
| 5,687,198 A | * | 11/1997 | Sexton et al. ............... 375/347 |
| 5,909,470 A | * | 6/1999 | Barratt et al. ............... 375/324 |
| 5,937,014 A | * | 8/1999 | Pelin et al. ................. 375/340 |

OTHER PUBLICATIONS

Diggavi, S.N.; Young Man Cho; Paulraj, A.; Global Telecommunications Conference, 1995. Globecom '95., IEEE, vol.: 1, Nov. 13–17, 1995; pp.: 72–76 vol. 1.*

Talwar, S.; Viberg, M.; Paulraj, A.; Signal Processing, IEEE Transactions on [see also Acoustics, Speech, and Signal Processing, IEEE Transactions on], vol.: 44, Issue: May 5, 1996 pp.: 1184–1197.*

* cited by examiner

*Primary Examiner*—Stephen Chin
*Assistant Examiner*—Cicely Ware
(74) *Attorney, Agent, or Firm*—Perman & Green, LLP

(57) ABSTRACT

A procedure for the semi-blind separation and detection of digital co-channel signals, whereby after a simultaneous spatial-temporal equalization, iterative projections of the symbol vectors to be detected, in a vector subspace or a symbol alphabet $\Omega$ of finite size are initialized making use of a network user identifier $ID_i$. These projections are then used to adapt the symbol vectors $S_i$ to the vector subspace and to the symbol alphabet $\Omega$ of finite size, making use of the method of least squares algorithm but performing only matrix multiplications without eigenvalue or singular decompositions.

10 Claims, 2 Drawing Sheets

ITERATIVE PROJECTION WITH INITIALIZATION USING A NETWORK USER IDENTIFIER

Figure 1:
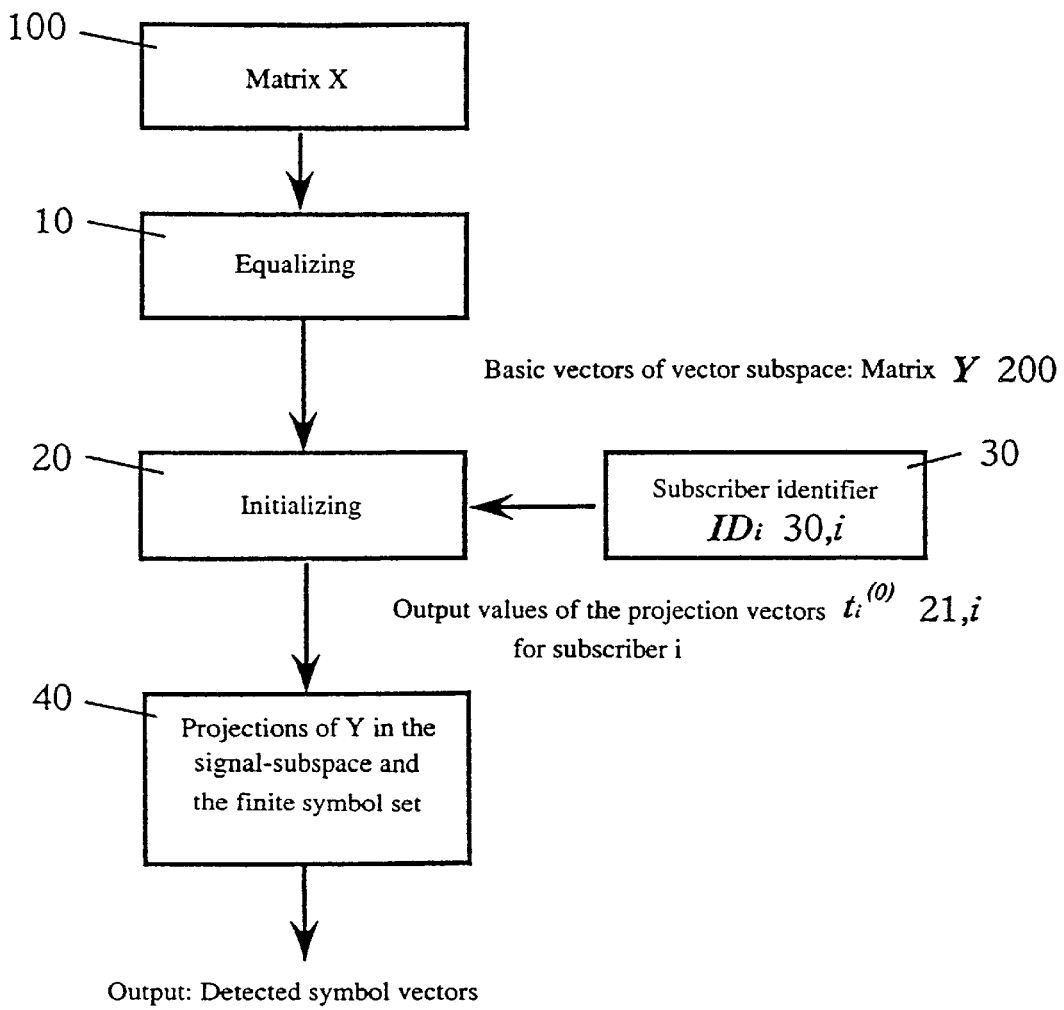

This application claims the benefit of the earlier filed International Application No. PCT/FI99/00493, International Filing Date, 8 Jun. 1999, which designated the United States of America, and which international application was published under PCT Article 21(2) in English as WO Publication No. WO 99/65161 on Dec. 16, 1999.

TECHNICAL FIELD

This invention relates to a procedure and a device for the semi-blind separation and detection of digital co-channel signals. Cellular mobile communication networks are usually limited by co-channel interference, i.e. the spatial reuse of the very same radio link becomes limited through co-channel interference. A radio link is defined by its frequency and/or its time slot (in the time-sharing multiplex method) and/or its code (in the code multiplex method). To allow more than one subscriber on the very same radio traffic channel, procedures have been proposed which are based on spatial separability and separation of the subscriber signals (SDMA, Space Division Multiple Access). For this purpose co-channel signals are purposefully generated and detected by the base station.

These procedures employ group antennas with connected signal processing, which by forming the antenna radiation pattern reduces the co-channel interference for individual subscribers. Such a procedure is for instance described in U.S. Pat. No. 5,515,378 (Roy and Ottersten). Three fundamentally different methods can be distinguished. Those that are based on knowledge of the spatial structure of the antenna group (the so-called spatial-reference-procedures) as described in R. Roy and R. Kailath in "ESPRIT-Estimation of Signal Parameters via Rotational Invariance Techniques", IEEE Trans. Acoust., Speech, Signal Processing, Bd. 37, July 1989, pp. 984–995; procedures that are based on the knowledge of the known signal sequence (so-called temporal reference procedure), explained by S. Ratnavel, A. Paulraj and A. G. Constantinides in "MMSE Space-Time Equalization for GSM Cellular Systems", Proc. Institute of electrical and Electronics engineers, IEEE, Vehicular Technology Conference 1996, VTC'96, Atlanta, Ga., pp. 331–335; and so-called "blind" procedures which use known signal properties for separation and detection.

In the case of spatial procedures, the angle of incidence of the separate signals by different subscribers is estimated with the help of extensive procedures, and the information obtained is used to optimize the combination of the antenna signals. These spatially filtered signals are then detected in a separate receiver. Currently known methods have a lower limit for the angular separability and fail below this limit. This is a difficult problem because ideally the lower limit should be zero degrees.

A serious problem with the temporal reference procedure is the requirement to exactly synchronize the known training sequence with the incoming signals from a subscriber. Due to the multiple paths and the unknown distance between the transmitter and the receiver, the precise sampling instant is not known beforehand, and it also differs for the individual test signals. Only after synchronization can procedures be applied to adapt the weighting parameters of the individual antenna elements, which finally determines the effective radiation pattern. The alternative, the simultaneous synchronization and adapting of the weighting antenna parameters is computationally considerably extensive as shown in J. Fuhl, D. J. Cichon, E. Bonek, Optimum Antenna Topologies and Adaptation Strategies for SDMA, IEEE Global Communications Conference, Nov. 18–22, 1996, London, UK, PP. 575–580.

As far as the "blind" procedures are concerned, these use very common signal properties such as transmitting with a fixed sampling rate (FSR), selecting the symbols to be transmitted from a finite alphabet size (finite alphabet, FA) and transmitting the signals with a constant envelope (constant modulus, CM), as explained in J. Laurila, E. Bonek, SDMA Using Blind Adaptation, ACTS Mobile Communication Summit, Aalborg, Denmark, Oct. 7–10, 1997, pp. 314–319, or A-J. van der Veen, A. Paulraj, Singular Value Analysis of Time-Space Equalization in th GSM Mobile System, Proc. IEEE ICASSP'96, May 1996, Atlanta, Ga., pp. 1073–1076. These are computationally very extensive and have therefore not been used in the civilian mobile radio so far. The ILSP (Iterative Least Squares with Projection) procedure described in the publication by S. Talwar, M. Viberg, A. Paulraj called "Blind Separation of Synchronous Co-Channel Digital Signals Using an Antenna Array-Part 1: Algorithms". IEEE Trans. Signal Proc., Vol 44, pp. 1184–1197, May 1996, is based on the assumption of a finite number of transmission symbols, and is in principle suitable for the blind separation and detection of co-channel signals. It is, however, highly dependent on the accuracy of the initial values of the iterative signal estimation. The problem gets still worse when non-linear modulation methods are used for the transmission. This is unfortunately the case with modern mobile radio systems, for example in the GSM system (Global Systems for Mobile Communications) and in the DECT system (Digital Enhanced Cordless Telecommunications), which employ the non-linear Gaussian filtered Minimum Shift Keying modulation method. In such cases the above mentioned procedure must be complemented with an algorithm that takes advantage of the constant envelope of the signal, such as for instance ACMA (Analytical Constant Modulus Algorithm) proposed by A. J. van der Veen, A Paulraj in "An Analytical Constant Modulus Algorithm", IEEE Trans. on Signal Proc., vol 44, pp. 1136–1155, May 1996. This requires further extensive arithmetic steps added to the blind detection and signal separation procedure, which in itself is already very complex.

U.S. Pat. No. 5,619,533 (Dent) and U.S. Pat. No. 5,519,727 (Okanoue) describe an equalizer which employs a MLSE (Maximum Likelihood Sequence Estimator) that obtains its information from a sole antenna signal. A space-time equalization is not possible as there is only one antenna signal, but on account of the enormous amount of memory needed for the intermediate steps of the MLSE, it would anyhow be disadvantageous. The patent specification U.S. Pat. No. 5,432,816 (Gozzo) refers to a correction that together with the method of the least squares error provides recursive estimations of the channel. This equalizer method also only obtains its information from a sole antenna signal. Receivers that employ such equalizers are based on inaccurate channel estimation values, because they for instance cannot utilize any structural properties of the transmitted signals.

DISCLOSURE OF THE INVENTION

The invention is based on the requirement to provide a semi-blind procedure for the separation and detection of digital co-channel signals, comprising the steps:

simultaneous (joint) spatial-temporal equalization, initialization of iterative projections using the subscriber identifier, and carrying out the above mentioned projections for the adaptation of a symbol vector both to the signal subspace and a finite alphabet symbol constellation, in both cases making use of the least squares error algorithm, but performing only matrix multiplications without eigenvalue or singular value decompositions.

The last step is repeated k times until the last iteration of the detected symbol vector no longer differs from the penultimate one.

The temporal synchronization for the initialization of the second step is easily achieved by correlating the respective subscriber identification with the basic vectors that span the desired vector subspace.

Another aspect of the invention is performing the projections in a decoupled way, dividing them between the individual subscribers. This allows the use of only simple matrix multiplication in these projections and avoids the excessive computing needed in traditional procedures. The extensive calculation of the pseudoinverse of the input matrix, including the orthonormal basic vectors of the desired vector subspace, is only required one single time, namely before initialization.

The temporal equalization carried out simultaneously with the spatial equalization, which is based on the processing of several antenna signals, leads to a co-channel interference suppression distinctly improved from that which the temporal equalization of one antenna signal alone can provide.

SHORT DESCRIPTION OF THE DRAWINGS

The procedure is now more closely explained by means of the figures, in which

FIG. 1 shows the fundamental steps of the procedure and

Figure 2:
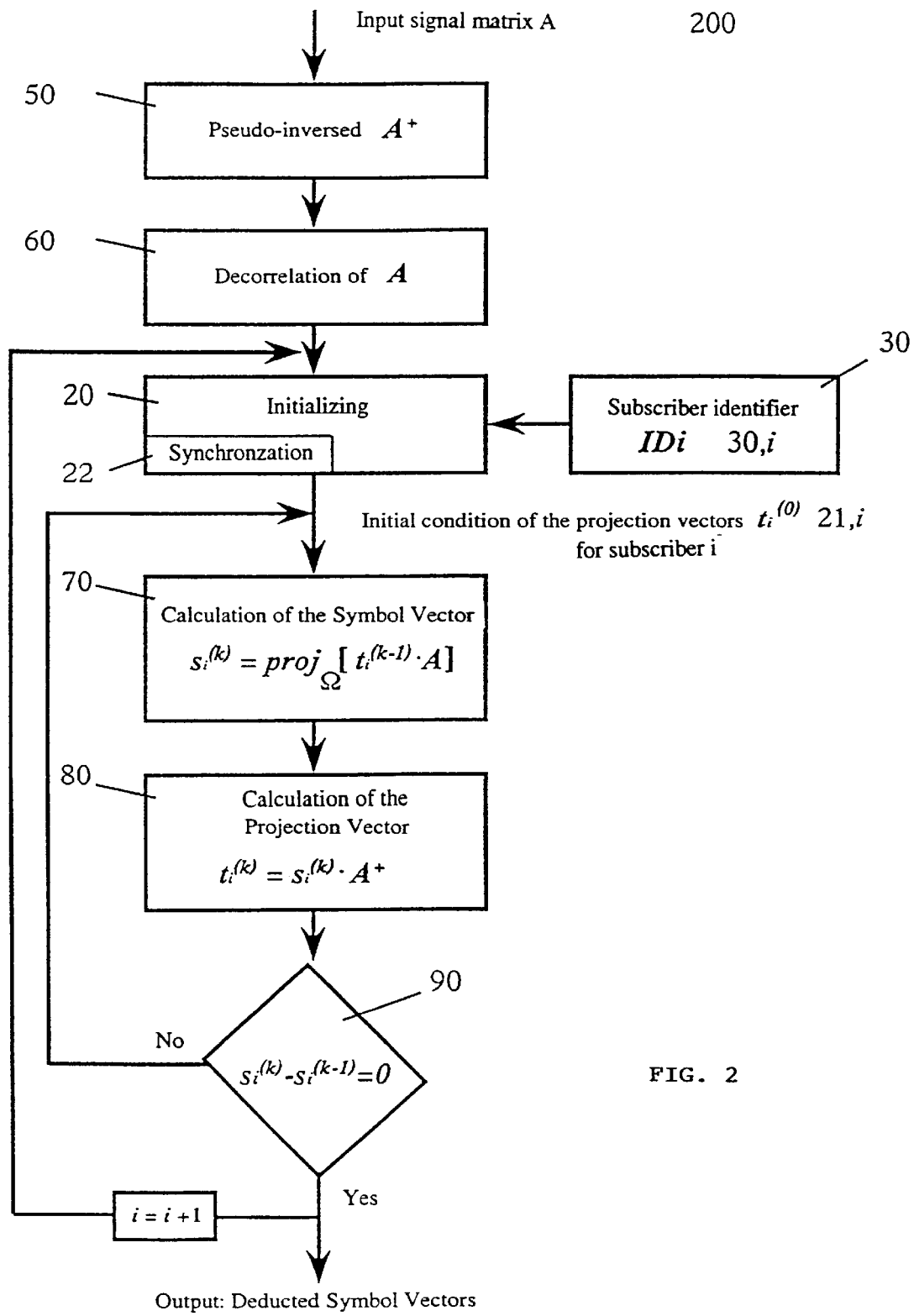

FIG. 2 describes how to carry out the last two parts of the procedure in FIG. 1, however with the generalization that the received signal matrix A (200) does not necessarily have to consist of orthonormal base vectors. The fact that the received signal matrix A (200) can also be used as an input makes the procedural step (60) necessary.

PREFERRED EMBODIMENTS OF THE INVENTION

As shown in FIG. 1, a matrix X of noisy input signals of several common channel signals serves as an input data record to be further processed by the procedure. The matrix X contains N sampling values, P times oversampled, of d co-channel signals that are derived from the M single elements of a group antenna.

This received signal matrix X will be simultaneously spatially and temporally equalized in procedural step (10), in a known manner, so as to create a new matrix Y. In the preferred embodiment of the invention, the lines of the Y matrix and the lines of the symbol matrix S, having Block-Toeplitz-Form, span the same vector subspace. For this procedural step (10) either the singular value decomposition or the computationally efficient but sub-optimal subspace tracking method can be used. This extensive calculation however is only required one single time in the course of the whole procedure.

In procedural step (20) the initialization of the projection vector $t_i$ is carried out with the help of the network subscriber identifier $ID_i$ which is included in the corresponding (co-channel) signal $S_i$. In every TDMA mobile radio system some known symbols for the channel estimation (e.g. midamble in the GSM system) are sent which can be used for the network subscriber identification.

In the final procedural step (40) alternate projections of the matrix Y are done both on the vector subspace as well as on the known symbol alphabet of finite size. Here the projections are nothing more than multiplication of this matrix with the projection vector $t_i$ and rounding of the symbol vector to the known symbols of the symbol alphabet Ω respectively. Additionally simultaneous adaptation of the symbol vector to the vector subspace and to the symbol quantity of finite size takes place by means of the least squares error algorithm. This last procedural step (40) provides after K iterations the vector including the detected symbols of the subscriber i. The iteration is stopped as soon as the symbol vector of two consecutive iterations is no longer different. One can then go on to the next subscriber i+1 and run the procedure again starting from step (20).

Referring to FIG. 2, the Moore-Penrose pseudoinverse A+ is calculated in procedural step (50).

If the matrix A was not formed by orthonormal base vectors using spatial-temporal equalization but the received signal matrix X was employed directly, the procedural step (60) becomes necessary to distribute the jammer and interference terms equally in space. This procedure is called "pre-whitening".

In the known procedural step (20), the i:th signal is selected using a network subscriber identifier $ID_i$, and the projection vector $t_i$ is initialized with it. In the initialization step (20) a substep (22) can be inserted for the choice of the optimal synchronization instant, which can be determined by the position of the maximum cross correlation between the base vectors derived from the first procedural step (10) according to FIG. 1 and the known network subscriber identifier $ID_i$.

In procedural step (70) the symbol vector corresponding to the i:th signal is computed as the product of the projection vector and the received signal matrix $t_i^*A$. This symbol vector is projected on the vector subspace and on the finite set of the known symbols, making use of the method of the least squares error. Mathematically this procedural step can be calculated as $s_i^{(k)} = \text{proj}_\Omega[t_i^{(k-1)}A]$.

With this new k:th value of the symbol vector $s_i^{(k)}$ a new calculation of the projection vector t according to $s_i^{(k)} = \text{proj}_\Omega[t_i^{(k-1)}A]$ is carried out in procedural step (80). The iterations are continued until convergence is achieved, i.e. until an estimate of the symbol vector is no longer different from the preceding iteration (90). One can then pass on to the estimation of a next symbol vector corresponding to another signal.

It should be noted that a special advantage of the procedure is that the number of signals to be so estimated is basically unlimited. However, only one single signal is detected at a time, i.e. the signal detection is always separate from the detection of all other signals. If the number of the subscriber signals in the cell is known, the procedure can be stopped after the estimation of these signals. Contrary to spatial reference procedures, it is unnecessary to estimate all signals in order to decide whether it is a usable signal or noise. One advantage of the procedure is in fact that the number of co-channel signals can be determined in the first procedural step in an elegant way.

A further special advantage of the procedure is that it is independent of the employed modulation format. It is also particularly suitable for the non-linear modulation methods which are usual in mobile communications of today. Such a modulation method does not, unlike known means, lead to an increase of the computing time. In addition, with our method it is possible to detect non-synchronized co-channel signals. This procedure too is extremely robust against instantaneous changes of the interference sources, which means that no synchronization is required within the mobile communication network.

It should also be noted that the procedure basically supplies two difference signal estimates: The projection on the vector subspace, making use of the means of the least squares method, supplies a soft estimate (Soft Signal Estimation), while the result of the projection on the signal alphabet supplies a "hard" estimate (Hard Signal Estimation). The results of the soft estimation can be used for forward error correction.

In real band-limited systems, oversampling in the time domain alone supplies too little information for blind separation of signals. One advantage of the present is the combination of signals from several or all antennas. This results in a higher robustness against co-channel interference and moreover allows the estimation of all co-channel signals in FIR-MIMO (Finite Impulse Response, Multiple Inputs pet, Multiple Output) applications. Further, our procedure allows a considerably simple hardware structure than traditional beamforming methods. Therefore, a further advantage consists in the fact that the estimation of the channel impulse response and the symbol detection can be carried out in one step. The channel estimation and the symbol detection usually occur separately.

Unlike the traditional detection, using MLSE (Maximum Likelihood Sequence Estimation) together with the Viterbi algorithm, the signal separation in the present invention is based on iterative estimation. The projection of the estimated row space of the data matrix on the known, finite set of modulation symbols is used, employing the means of the least squares algorithm. This procedure is computationally considerably simpler.

Traditional receivers employ only a short known part of the transmitted signal sequences (so-called training sequences) to estimate the channel impulse response. In contrast to this, the data and channel estimation in our semi-blind procedure is carried out making use of all transmitted symbols. In this way a higher estimation accuracy is achieved.

A special advantage of this new procedure is the relatively short computing time for the semi-blind estimation, separation and detection of co-channel signals. Considering the first part of procedural step (70), the multiplication of the projection vector $t_i$ with the matrix A requires $2*l*N$ arithmetic operations, when the matrix A is of the size $\delta*N$, with N being the number of sampling instants and $\delta$ being the dimension of the projection vector t. In general, the value of $\delta$ is approximately the same as the number of the signals to be detected. The same number of operations are required in arithmetic step (80) for the new calculation of the projection vector t. Because of this, $K*d*(4*\delta N)$ arithmetic steps are necessary, where d is the number of the estimated signals and K the number of the needed iterations per signal. Extensive computer simulations have shown that already with $K=2 \ldots 3$ one finds convergence if known user identifiers and known basic vectors are used for initialization. The number N of sampling values required for the detection lies in the range of 40–90, which is about half of the symbols of one single GSM time slot. With these parameters our procedure, compared with spatial reference algorithms having the same bit error rate, requires only ⅓ of the antenna elements.

To further reduce the computational time of the embodiment according to FIG. 2 while increasing the robustness of the estimation of weak signals, the first symbol vector $s_i$ can after its final detection be subtracted from the received signal matrix A. This procedure is called serial interference cancellation. Here the best results are obtained if the received signals are estimated in the order of decreasing power. The improvement of the estimation robustness through serial interference cancellation is the best when the projection algorithm is applied directly on the data matrix without any estimation of the vector subspace.

As a result, the co-channel interference is reduced for the detection of the remaining co-channel signals and the de-correlation step (50) is made less complex and the estimation of the subsequent symbol vectors is made more robust.

In general, the here described procedures are not only computationally less extensive than tranditional procedures, but they are also, using a suitable initialization based on subscriber identification, considerably more robust against noise interference and signals from neighbour cells.

A further advantageous embodiment of the invention does not use any preceding estimation of the vector subspace at all. Normally a procedure for the separation and detection of co-channel signals would be extremely unreliable. However, because the initialization (20) with a subscriber identification supplies good initial values for the subsequent iterative projections, calculations can in this case too be performed with good results, which extensive computer simulations have shown.

The means for the implementation of the described procedures is a signal processor. Signal processors, even if having small capability, are already used today in digital mobile communications receivers. For the appropriate implementation of the procedure in a signal processor, it has to be noted that the received signal matrix X is highly symmetrical. One column follows with time displacement the preceding one, while another element is added. This kind of symmetrical structure, which enables temporal equalization, also enables the block-by-block calculation of matrices and/or their inverse values in the first procedural step (10). Here the advantage is the largest, because this procedural step constitutes by far the largest part of computation time through the necessary matrix inversions for the spatial temporal equalization.

In the procedural substep of the projection (70) of the symbol vectors $s_i$ on the symbol alphabet $\Omega$, a further decrease in computational time ban bee achieved, as the generally complex elements of the symbol alphabet $\Omega$ are made real through derotation with differentially coded phase modulation. As a result, an implementation based on a signal processor that can only handle real value operations becomes possible.

What is claimed is:

1. A procedure for semi-blind separation and detection of digital co-channel signals, characterized in that after a simultaneous spatial-temporal equalization, iterative projections of the symbol vectors $S_i$ to be detected in a vector subspace and/or a symbol alphabet $\Omega$ of finite size are initialized making use of a network user identifier $ID_i$, after which said projections are used to adapt said symbol vectors $S_i$ to the vector subspace and to the symbol alphabet $\Omega$ of finite size, in both cases making use of the least squares algorithm and performing only matrix multiplications without eigenvalue or singular value decompositions.

2. A procedure according to claim 1, characterized in that the projections and their latest calculations are repeated until the detected symbol vector of the last iteration is no longer different from that of the penulimate one.

3. A procedure according to claim 1, characterized in that the initialization of every projection vector $t_i$ is carried out for every co-channel signal separately and decoupled from all other signals, employing a network user identity sequences $ID_i$ for the respective co-channel signal.

4. A procedure according to claim 1, characterized in that the initialization of every projection vector $t_i$ is optimally synchronized when the position of the peak value of the cross correlation between the basic vectors, determined in the equalization step, and the known network user $ID_i$, is determined as the optimal synchronization instant.

5. Procedures according to claim 1, characterized in that after successful detection, the detected symbol vector is subtracted from the received signal matrix X, Y or A in the order of decreasing signal power, estimated using signal matching filtering (correlation of the known training sequences with the received data), before the next symbol vector is detected.

6. A procedure for semi-blind separation and detection of digital co-channel signals, characterized in that input signal matrix including oversampled values of a number of co-channel signals is simultaneously spatially and temporally equalized and, iterative projections of the symbol vectors $S_i$ to be detected in a vector subspace and/or a symbol alphabet $\Omega$ of finite size are initialized making use of a network user identifier $ID_i$, after which said projections are used to adapt said symbol vectors $S_i$ to the vector subspace and to the symbol alphabet $\Omega$ of finite size, in both cases making use of the least squares algorithm and performing only matrix multiplications without eigenvalue or singular value decompositions.

7. A procedure according to claim 6, characterized in that the projections and their latest calculations are repeated until the detected symbol vector of the last iteration is no longer different from that of the penulimate one.

8. A procedure according to claim 6, characterized in that the initialization of every projection vector $t_i$ is carried out for every co-channel signal separately and decoupled from all other signals, employing a network user identity sequence $ID_i$ for the respective co-channel signal.

9. A procedure according to claim 6, characterized in that the initialization of every projection vector $t_i$ is optimally synchronized when the position of the peak value of the cross correlation between the basic vectors, determined in the equalization step, and the known network user $ID_i$, is determined as the optimal synchronization instant.

10. Procedures according to claim 6, characterized in that after successful detection, the detected symbol vector is subtracted from the received signal matrix X, Y or A in the order of decreasing signal power, estimated using signal matching filtering (correlation of the known training sequences with the received data), before the next symbol vector is detected.

* * * * *

UNITED STATES PATENT AND TRADEMARK OFFICE
CERTIFICATE OF CORRECTION

PATENT NO. : 6,829,312 B1
DATED : December 7, 2004
INVENTOR(S) : Vienna et al.

It is certified that error appears in the above-identified patent and that said Letters Patent is hereby corrected as shown below:

Title page,
Item [75], Inventors, line 1, delete "Vienna (AT)" and insert -- Espoo, Finland --, therefor.
Line 2, delete "Vienna (AT)" and insert -- Wien, Austria --, therefor.

Column 7,
Line 9, delete "sequences" and insert -- sequence --, therefor.

Signed and Sealed this

Twenty-ninth Day of March, 2005

JON W. DUDAS
*Director of the United States Patent and Trademark Office*